(12) United States Patent
Palmer et al.

(10) Patent No.: US 10,032,396 B2
(45) Date of Patent: Jul. 24, 2018

(54) METHOD FOR INCREASING VALUE OF AIRPORT TERMINAL EXTERIOR ADVERTISING

(71) Applicant: Borealis Technical Limited, North Plains, OR (US)

(72) Inventors: David A. Palmer, Northamptonshire (GB); Joseph J. Cox, Portland, OR (US); Rodney T. Cox, North Plains, OR (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 14/898,139

(22) PCT Filed: Jun. 13, 2014

(86) PCT No.: PCT/US2014/042430
§ 371 (c)(1),
(2) Date: Dec. 13, 2015

(87) PCT Pub. No.: WO2014/201437
PCT Pub. Date: Dec. 18, 2014

(65) Prior Publication Data
US 2016/0140885 A1    May 19, 2016

Related U.S. Application Data

(60) Provisional application No. 61/834,463, filed on Jun. 13, 2013.

(51) Int. Cl.
*G01C 23/00* (2006.01)
*G05D 1/00* (2006.01)
(Continued)

(52) U.S. Cl.
CPC ......... *G09F 15/02* (2013.01); *G06Q 30/0241* (2013.01); *G09F 23/00* (2013.01)

(58) Field of Classification Search
CPC ........ B64F 1/3055; B64F 1/002; G09F 19/22; B64C 25/405
See application file for complete search history.

(56) References Cited

U.S. PATENT DOCUMENTS 3,184,772 A    8/1965    More et al.
4,424,449 A *  1/1984    O'Brill ................... G09F 13/20
                                                    250/461.1
(Continued)

*Primary Examiner* — Shin H Kim

(57) ABSTRACT

A method for increasing and optimizing the value of airport terminal exterior advertising is provided that significantly increases exposure of exterior advertising displays on the airside or non-public side of an airport terminal to passengers on arriving, parked, and departing aircraft. The movement of aircraft equipped with non-engine drive means on landing gear wheels for autonomous ground movement is controlled within an airport ramp area so that the aircraft moves in only a forward direction toward and away from a terminal parking place and parks in an orientation parallel to the terminal. The direction and orientation of aircraft ground travel and parking parallel to a terminal enhances and improves the visibility of exterior advertising displays to a maximum percentage of the passengers in the aircraft as the aircraft travels within the ramp area and parks between arrival and departure.

8 Claims, 1 Drawing Sheet

(51) Int. Cl.
  *G05D 3/00* (2006.01)
  *G06F 7/00* (2006.01)
  *G09F 15/02* (2006.01)
  *G06Q 30/02* (2012.01)
  *G09F 23/00* (2006.01)

(56) References Cited

U.S. PATENT DOCUMENTS

| | | | | |
|---|---|---|---|---|
| 5,288,163 A | * | 2/1994 | Munson | G09F 19/22 |
| | | | | 33/574 |
| 5,497,157 A | * | 3/1996 | Gruener | G01S 13/343 |
| | | | | 342/29 |
| 5,873,674 A | * | 2/1999 | Hohl | E01F 9/512 |
| | | | | 404/10 |
| 6,100,964 A | * | 8/2000 | De Cremiers | B64F 1/002 |
| | | | | 340/958 |
| 6,657,334 B1 | | 12/2003 | Edelson | |
| 6,838,791 B2 | | 1/2005 | Edelson | |
| 6,914,542 B2 | * | 7/2005 | Hutton | B64F 1/00 |
| | | | | 244/114 R |
| 7,116,019 B2 | | 10/2006 | Edelson | |
| 7,445,178 B2 | | 11/2008 | McCoskey et al. | |
| 7,469,858 B2 | | 12/2008 | Edelson | |
| 7,603,737 B2 | * | 10/2009 | Hutton | B64F 1/3055 |
| | | | | 14/71.5 |
| 7,752,786 B2 | * | 7/2010 | Webster | G09F 19/22 |
| | | | | 40/217 |
| 8,259,094 B2 | | 6/2012 | Galligan et al. | |
| 8,645,004 B2 | * | 2/2014 | Anderberg | B64F 1/3055 |
| | | | | 14/71.5 |
| 9,771,148 B2 | * | 9/2017 | Cox | B64C 25/405 |
| 2002/0030609 A1 | * | 3/2002 | Baumgartner | B64F 1/002 |
| | | | | 340/958 |
| 2006/0143956 A1 | * | 7/2006 | Star | G06Q 30/0264 |
| | | | | 40/584 |
| 2006/0273686 A1 | | 12/2006 | Edelson et al. | |
| 2007/0252037 A1 | * | 11/2007 | Greaves | B64F 1/00 |
| | | | | 244/114 R |
| 2008/0000121 A1 | * | 1/2008 | Star | G06Q 30/0264 |
| | | | | 40/594 |
| 2008/0040962 A1 | * | 2/2008 | Gurren | G09F 7/00 |
| | | | | 40/611.1 |
| 2008/0154728 A1 | | 6/2008 | Thomas | |
| 2011/0225860 A1 | * | 9/2011 | Troiano | G09F 7/08 |
| | | | | 40/601 |
| 2015/0379962 A1 | * | 12/2015 | Jung | G09F 19/12 |
| | | | | 345/690 |

* cited by examiner

METHOD FOR INCREASING VALUE OF AIRPORT TERMINAL EXTERIOR ADVERTISING

PRIORITY CLAIM

This application claims priority from U.S. Provisional Patent Application No. 61/834,463, filed 13 Jun. 2013, the disclosure of which is fully incorporated herein.

TECHNICAL FIELD

The present invention relates generally to increasing airport revenue by increasing airport value and specifically to a method for increasing airport revenue by increasing the value of airport terminal exterior advertising.

BACKGROUND OF THE INVENTION

Today's airports, especially those airports with global flight traffic, are experiencing cost pressures from a number of sources. In the past, primary sources of airport revenue included fuel sales and hangar leases. The airline industry has changed, however, and airport operators are constantly looking for additional revenue sources to fund operations and the infrastructure expansion required to meet the increased demand for air travel. Aviation-based revenue may no longer be a consistently reliable source of income for an airport. Global competition among airlines has affected airline revenue, and airlines have looked for ways to pass cost pressures from their reduced revenue to airports. Consequently, airport operators are looking for ways to increase revenue, particularly revenue from non-aviation sources.

At many airports, non-aviation revenue, such as that generated by in-terminal food courts and retail stores, may account for a majority of the airport's income. Marketing and advertising these goods and services has become a strategic priority for an increasingly large group of airport operators as they try to expand and diversify potential revenue sources. The days when airports were defined simply as places for airlines to land, pick up passengers, and take off are long gone. Since an airport's environment can have a significant impact on an air traveler's experience, airports able to enhance that experience are likely to be more successful. This may be particularly true of competing hub system airports. An airport with a solid foundation of non-aviation revenue will be able not only to provide an environment that will attract passengers, but will also be more likely to be operated as a profitable enterprise.

Most non-aviation revenue realized by an airport is generated by sales of goods and/or services within the airport terminal environment. Advertising these goods and services to airport "customers," the air travelers, members of the public who accompany departing air travelers to an airport and wait for them to arrive, and any others visiting an airport, is essential to effectively communicate the nature and availability of such goods and services. At the present time, the advertising of airport services, as well as non-airport services, is confined primarily to the inside of airport terminal buildings. A wide range of advertising signs and displays may be positioned in interior locations determined to most effectively communicate with the airport population. These locations can range from the interiors of passenger loading bridges to interior gate areas to restrooms to virtually anywhere advertising may be seen and read.

Airport operators have become aware that maximizing advertising exposure to as many potential consumers as possible is necessary to optimize revenue from these goods and services. In addition to placing advertising displays in airport interior spaces, airport exterior spaces are increasingly used to advertise in-terminal retail goods and services to aircraft passengers. An airport exterior advertising system that extends the availability of the advertising displayed during takeoff and landing is described by Webster et al in U.S. Pat. No. 7,752,786. This system employs horizontal ground level billboards located between runway extremities and takeoff/touchdown areas or adjacent to taxiways where the advertisements on the billboards can be viewed by airline passengers while an aircraft is taxiing or waiting on a taxiway. This advertising system would appear to be most effectively viewed by passengers as they look out a window in an airline moving very slowly or waiting on a runway or taxiway. Passengers, however, are likely to find other things to do rather than look out aircraft windows toward the ground under these circumstances. The effectiveness and value of this kind of advertising may not significantly enhance airport revenue.

Locating advertising signs and/or displays on or near outside surfaces of airport terminals has been proposed. Most current airport exterior advertising tends to be located in car parking areas or in areas accessible to the public that are likely to be seen by persons approaching or leaving an airport by cars, buses, or other vehicles. Some limited advertising has been used by airports on parts of airport terminal buildings or related structures on the "airside" part of the terminal that is not accessible to the public to attract the attention of departing and arriving air travelers. Examples include London's Heathrow Airport, where advertising displays have been placed on terminal building exterior wall surfaces. Heathrow and some United States and Canadian airports also have placed advertising displays on the exteriors of passenger loading bridges. Because aircraft presently arrive and park in a perpendicular orientation relative to a terminal building with the aircraft nose end closest to the terminal, advertising displayed on a face of the terminal building is likely to be more visible to the aircraft's cockpit crew than to the passengers. An advertising display on the exterior of a passenger loading bridge will only be seen by passengers in an aircraft that is oriented so that passengers have a clear view of the loading bridge.

The current travel path of arriving and departing aircraft does not provide maximum passenger exposure to airport terminal exterior advertising displays. Aircraft arrive at a terminal gate or loading bridge after traveling in a forward direction with the aircraft nose directed toward the terminal so that the aircraft is essentially perpendicular to the terminal or loading bridge. Departing aircraft are pushed in reverse, again along a path that is essentially perpendicular to the terminal, to a point where the aircraft can start its engines and travel in a forward direction to a taxiway. These orientations of an aircraft at arrival and departure do not enable passengers to easily view exterior airport terminal advertising displays. Consequently, exposure to this advertising is not maximized, and the potential value of the advertising to the providers of the advertised goods and services and to the airport is not optimized.

A need exists, therefore, for a method for increasing and optimizing the value of airport terminal exterior advertising by providing maximum exposure of exterior terminal advertising displays to passengers in aircraft arriving at and departing from terminal areas with exterior advertising displays.

SUMMARY OF THE INVENTION

It is a primary object of the present invention, therefore, to provide a method for increasing and optimizing the value of airport terminal exterior advertising to airport businesses advertising goods and services and to airport operators.

It is another object of the present invention to provide a method for increasing and optimizing the value of exterior advertising displays on airside portions of airport terminal buildings and associated structures by increasing exposure to the advertising to a maximum number of arriving and departing airline passengers.

It is an additional object of the present invention to provide a method for increasing and optimizing value of airport terminal exterior advertising by controlling an aircraft's ground travel path in the vicinity of the terminal so that terminal exterior advertising displays are visible to the highest possible number of persons on the aircraft.

It is a further object of the present invention to provide a method for increasing value of airport terminal exterior advertising by orienting the direction of travel of an aircraft to enable a maximum number of passengers in an aircraft to view the advertising as the aircraft travels toward the terminal, parks parallel to the terminal, and then departs from the terminal.

It is yet a further object of the present invention to provide a method for increasing and optimizing value of exterior airport terminal advertising that takes advantage of the ability of an aircraft powered by non-engine drive means during ground movement to travel within an airport ramp area and park in an orientation relative to the terminal that ensures exposure of advertising displays to a maximum number of the aircraft's passengers.

In accordance with the aforesaid objects, a method for increasing and optimizing the value of airport terminal exterior advertising is provided that significantly increases exposure of exterior advertising displays on the airside or non-public side of an airport terminal to passengers on arriving, parked, and departing aircraft. The movement of aircraft equipped with non-engine drive means on landing gear wheels for autonomous ground movement is controlled within an airport ramp area so that the aircraft moves in only a forward direction toward and away from a terminal parking place and parks in an orientation parallel to the terminal. The direction and orientation of aircraft ground travel and parking parallel to a terminal enhances and improves the visibility of exterior advertising displays to a maximum percentage of the passengers in the aircraft as the aircraft travels within the ramp area and parks between arrival and departure.

Other objects and advantages will be apparent from the following description, drawings, and claims.

DESCRIPTION OF THE INVENTION

At the present time, aircraft taxiing to an arrival parking location at an airport terminal are driven during taxi by operation of one or more of the aircraft's engines or, in some situations, towed by a tug or other tow vehicle into the airport ramp area. At most airports, the aircraft's travel path is generally selected to direct the aircraft into a parking location at a gate where the aircraft can connect to a passenger loading bridge so that the nose end of the aircraft is directed toward the terminal. Upon departure, the loading bridge is retracted, and the aircraft is pushed back from the gate by a tug so that the aircraft travels in reverse to a location where the aircraft's engines can be started and the aircraft can be driven to a takeoff runway. Since the aircraft moves toward and away from the terminal in an orientation that is essentially perpendicular to the terminal, most passengers on the aircraft do not have a clear view of exterior surfaces of the terminal building. Consequently, advertising displays mounted on these exterior surfaces have limited exposure to passengers on arriving and departing aircraft, and the value of such advertising displays in attracting potential consumers of airport goods and services is limited.

The present invention provides a method for increasing the exposure of airport terminal exterior advertising to a significantly greater number of passengers on arriving and departing aircraft who may be consumers of the advertised goods and/or services and, as a result, increases the value of this advertising. The increased advertising exposure to a larger number of airline passengers that is possible with the present invention may ensure a greater awareness of products and services available within or near an airport terminal and may increase the likelihood that the passengers will purchase the advertised products and/or services. Advertising that is seen by more potential consumers of the advertised goods or services has a greater value than advertising that is seen by only a limited number of potential consumers.

Figure 1:
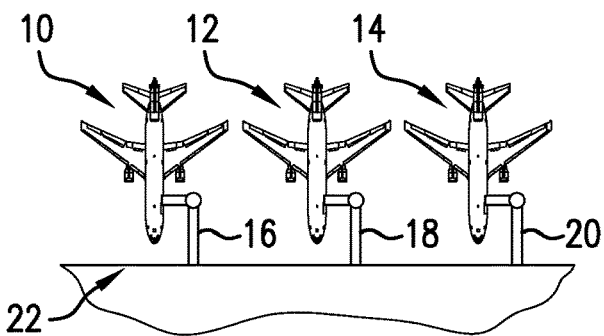
FIG. 1 is a diagram of an airport ramp gate area showing aircraft parked at passenger loading bridges in the nose-in orientation perpendicular to a terminal currently used to park aircraft.

Referring to the drawings, FIG. 1 is a diagram of three aircraft 10, 12, and 14 parked at respective passenger loading bridges 16, 18, and 20, representing three airport terminal gates as they are currently used. The spacing between the aircraft 10, 12, and 14 in FIG. 1 and that in the other drawings is not shown drawn to scale. The loading bridges 16, 18, and 20 are attached to a terminal building 22, and each provides a protected walkway for passengers to move between an aircraft and the terminal building during both boarding and departing the aircraft. None of the aircraft 10, 12, and 14 are equipped with non-engine drive means controllable to move the aircraft autonomously on the ground without reliance on the aircraft engines or tow vehicles. Consequently, the aircraft engines are required to provide the power to move the aircraft into the gate so they can dock at and attach to the loading bridges 16, 18, and 20. Any advertising displays on a face of the terminal 22 toward the aircraft 10, 12, and 14 is visible to only a small number of those on board these aircraft. The cockpit crew has the clearest view of such advertising displays. An advertising display placed on a side of a loading bridge toward an adjacent aircraft may be viewed by slightly more people, but such a display is not very likely to be visible to most aircraft passengers. An advertising display placed on an opposite side of the loading bridge will be very difficult to see. In the aircraft parking arrangement shown in FIG. 1, opportunities for air travelers to view exterior advertising displays on the terminal and loading bridges are limited, in large part because of the travel path and orientation of the parked aircraft, which tends to be defined by the use of the aircraft's engines to move the aircraft. Consequently, the value of this advertising is limited.

When space at terminal gates or other aircraft parking areas is tight, as is the case today at many airports, aircraft in which ground movement is powered by the aircraft's engines or tugs cannot maneuver effectively. Such aircraft not only have difficulty turning with a precise turning radius and cannot precisely control the distance traveled, but the challenges of jet blast and engine ingestion are present as long as the engines are operating. Consequently, aircraft today cannot simply drive in and out of gates along a ground travel path that permits aircraft passengers to clearly see exterior terminal or loading bridge exterior advertising displays during ground travel or when the aircraft is parked.

The method of the present invention is most effective when aircraft are able to follow a controlled ground travel path within an airport ramp area that permits a maximum number of passengers in the aircraft to see areas on an airport terminal building or loading bridges where advertising displays can be mounted. An aircraft's ground movements and ground travel path from shortly after the aircraft lands until just prior to takeoff are preferably controlled by controlling operation of one or more non-engine drive means that power one or more of the aircraft's nose or main landing gear wheels to drive the aircraft autonomously on a ground surface. Operation of the aircraft's main engines and the use of tow vehicles are not needed to move the aircraft, except possibly in an emergency situation. Equipping aircraft landing gear wheels, particularly nose landing gear wheels, with non-engine drive means controllable to move aircraft during taxi provides significant advantages for the management and control of airport terminal aircraft ground traffic as well as significant opportunities to expose aircraft passengers to exterior terminal advertising displays. Using controllable non-engine drive means to drive nose landing gear wheels enhances aircraft maneuverability on the ground as shown and discussed in commonly owned co-pending International Patent Application No. PCT/US13/72508, filed 29 Nov. 2013, entitled Airport Terminal Gate Traffic Management System, the disclosure of which is incorporated herein by reference. An aircraft so equipped is capable of the turns and rotation required to maneuver the aircraft into an orientation so that the aircraft travels parallel to a terminal building and most of the passengers on the aircraft have a clear view of the terminal building and any advertising displays placed on the terminal exterior. As previously noted, the greater the advertising exposure to potential purchasers, the greater the value of the advertising.

Figure 2:
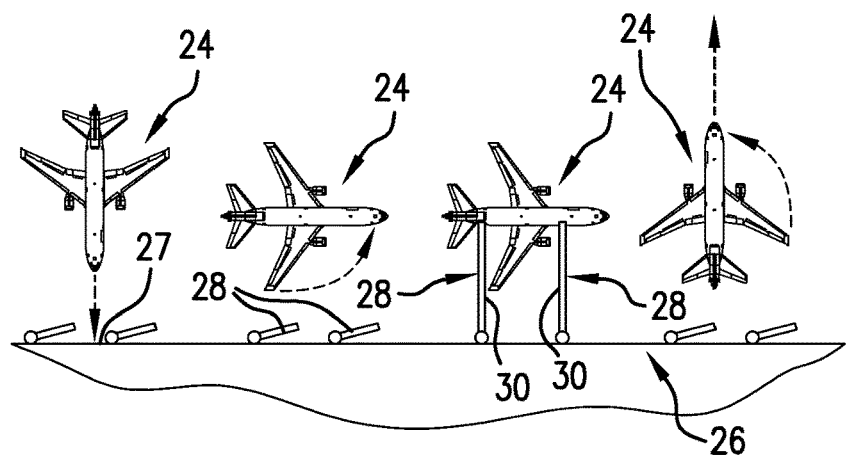
FIG. 2 is a diagram of an airport ramp area showing a terminal building and an aircraft equipped with non-engine drive means moving autonomously in only a forward direction into and out of a terminal parking location and parking parallel to the terminal building.

FIG. 2 illustrates control of aircraft autonomous ground movement in an airport ramp area to provide maximum aircraft passenger exposure to exterior advertising in accordance with the present invention. In FIG. 2, an aircraft 24, which is provided with controllable non-engine drive means for autonomous ground movement as discussed below, is shown approaching an airport terminal structure 26. The airport terminal structure 26 may be any one or more of a number of airport terminal and/or terminal-related or attached structures commonly found at an airport, airfield, or aerodrome and may be a structure where an aircraft parks to unload and load passengers or any other structure that an aircraft may pass during ground travel. It is only required that the terminal or related structure be able to support some kind of advertising display large enough to be visible to passengers on an aircraft that is moving at taxi speed or is parked. The terminal 26 may have a plurality of preferably flexible and extendible passenger loading bridges 28 as shown in FIG. 2. These loading bridges may be pivotally attached to the terminal 26 to pivot and extend into and out of connection with aircraft doors as shown. At many airports, loading bridges are not used, and passengers leave and enter aircraft by stairs. This passenger transfer procedure may provide additional opportunities for placement of exterior advertising displays, such as on terminal facing surface 27, that may be viewed as passengers walk across the tarmac to and from a parked aircraft.

The aircraft 24, preferably equipped with non-engine drive means as described herein, is shown approaching the terminal 26 in a nose-in orientation perpendicular to the terminal. The aircraft then rotates or turns 90° to park with the longest axis of the aircraft parallel to the terminal. The flexibly movable loading bridges 28 are located to connect to at least two aircraft doors when the aircraft is parked and may be retracted toward the terminal 26 and away from gate parking areas to facilitate parking of the aircraft parallel to the terminal. Upon arrival at the terminal 26, the aircraft 24 turns as described to park in a parallel orientation with respect to the terminal 26. The aircraft 24 may need to travel parallel to the terminal 26 to reach an assigned gate parking space or stand, which provides an additional opportunity for a maximum percentage of the passengers on board to view advertising displays on the terminal. One or more flexible movable loading bridges 28 may be extended from the terminal to connect with the aircraft front and/or rear doors. Advertising displays may be placed on the loading bridges, for example on exterior loading bridge walls 30, where they will be viewed by passengers waiting to depart from the aircraft. This is not intended to be limiting, however, and advertising displays may be placed wherever they may be easily seen by the most people as the aircraft travels into a ramp area and is maneuvered into or out of a gate or parking location.

When the aircraft 24 is ready for departure, the loading bridges 28 can be moved away from the aircraft to clear the parking space, and the aircraft pilot can activate and control the non-engine drive means to turn the aircraft 90° from a parallel orientation with respect to the terminal 26. Ultimately, the aircraft nose will be directed away from the terminal, and the pilot will drive the aircraft to a takeoff location where the aircraft engines will be started.

All of the aircraft ground movements shown in FIG. 2 maneuver the aircraft in only a forward direction, which enables the aircraft pilot to keep the aircraft travel area in view while the aircraft is turning and moving into or out of a terminal parking area. Maneuvering the aircraft only in a forward direction, as shown and discussed herein, also orients the aircraft relative to terminal exterior advertising displays as it moves so that these exterior advertising displays are exposed to a maximum percentage of the passengers on the aircraft. This extent of exterior advertising exposure to passengers on aircraft maneuvering in ramp areas far exceeds the advertising exposure that has heretofore been possible As a result, the value of such exterior advertising is increased.

Figure 3:
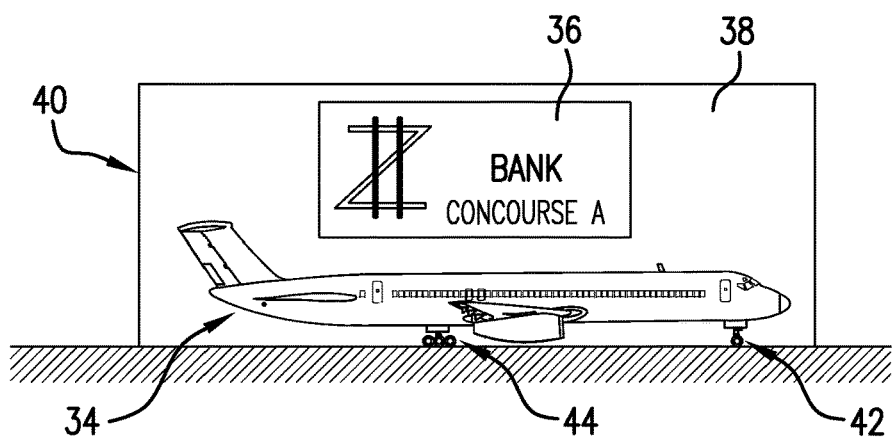
FIG. 3 is a diagram of an aircraft parked in an orientation parallel to a terminal building that has an exterior advertising display on a face of the terminal.

FIG. 3 illustrates an aircraft 34 in front of an advertising display 36 positioned on an exterior surface 38 of an airport terminal structure 40. The aircraft is oriented so that a longitudinal axis of the aircraft is parallel to the terminal 40. As noted above, this orientation enables the advertising display 36 to be clearly visible to a maximum percentage of the aircraft passengers. The aircraft 34 may be parked parallel to the terminal 40, or it may be moving parallel to the terminal 40 while in the process of arriving at or leaving a parking location parallel to the terminal. In either case, the parallel orientation of the aircraft with respect to the terminal exterior advertising display 36 permits a significantly greater exposure of the advertiser's message to more aircraft passengers than when an aircraft arrives and parks perpendicular to a terminal. This increased exposure to a larger number of potential consumers of the advertised goods or services increases the value of the advertising.

Although it is possible that airport terminal exterior advertising may have a greater effect on aircraft passengers arriving at an airport than those departing from the airport, departing passengers have at least been exposed to an advertiser's message and may remember the message when they return to the airport or when they arrive at another airport that offers the same goods or services. Since many goods and services today are available in a wide range of geographic areas in addition to in airport terminals, an airport terminal exterior advertising display may lead a potential consumer to try a product or service in another location. The method of the present invention provides more opportunities than are currently available for more potential consumers to be exposed to an advertiser's message through airport terminal exterior advertising, which leads to an increase in the value of this kind of advertising.

To maneuver aircraft in airport terminal ramp areas so that a maximum percentage of passengers on the aircraft are exposed to terminal exterior advertising as described herein, aircraft may be equipped with one or more controllable non-engine drive means mounted to power one or more landing gear wheels to drive the aircraft autonomously on the ground without reliance on aircraft main engines or tow vehicles. The preferred location for the controllable non-engine drive means is the aircraft nose landing gear wheels, such as the nose landing gear wheels 42 on the aircraft 34 in FIG. 3. Providing non-engine drive means controllable to drive one or more main landing gear wheels 44 (FIG. 3) to move an aircraft autonomously on the ground as described herein is also contemplated to be within the scope of the present invention and may be more suitable in some situations.

A preferred drive means may be an electric motor assembly, preferably powered by the aircraft's auxiliary power unit, that is capable of operating at the torque and speed required to move an aircraft landing gear wheel, and, therefore, an aircraft, autonomously on the ground. An example of one of a number of suitable types of drive means useful in an aircraft landing gear drive wheel that may be used effectively in the present invention is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move an aircraft wheel and function as described herein may also be suitable drive means. A high phase order electric motor of the kind described in, for example, U.S. Pat. Nos. 6,657,334; 6,838,791; 7,116,019; and 7,469,858, the disclosures of the aforementioned patents being incorporated herein by reference, can be effectively used as a drive means. One particularly suitable drive means is a high phase order induction motor with a top tangential speed of about 15,000 linear feet per minute and a maximum rotor speed of about 7200 rpm, although drive means capable of a wide range of such speeds may also be used to move an aircraft as described herein. Other kinds of drive means, including hydraulic and/or pneumatic motors, are further contemplated to be useful as landing gear wheel non-engine drive means.

When a plurality, or all, of aircraft landing and taking off at an airport are equipped with controllable non-engine drive means so that these aircraft are capable of moving in only a forward direction to park parallel to an airport terminal, the number of aircraft passengers exposed to terminal exterior advertising increases even more. As more aircraft using an airport are able to move autonomously into parallel parking orientations as described, terminal exterior advertising will be clearly visible to a greater percentage of aircraft passengers. An advertiser's message is able to reach a much larger audience, and this significantly increased exposure is accompanied by a concomitant increase in the value of the advertising.

While the present invention has been described with respect to preferred embodiments, this is not intended to be limiting, and other arrangements and structures that perform the required functions are contemplated to be within the scope of the present invention.

INDUSTRIAL APPLICABILITY

The method for increasing value of airport terminal exterior advertising of the present invention will find its primary applicability where airport operators are interested in increasing airport revenue from non-aviation sources, particularly from the sales of goods and services offered to air travelers by airport terminal retail goods and food and beverage outlets that use exterior advertising displays.

The invention claimed is:

1. A method that maximizes exposure of advertising displays on airside non-public structures in airport ramp areas to aircraft passengers and optimizes value of the advertising displays on the airside non-public structures in the airport ramp areas as direction of aircraft travel into and out of the airport ramp areas is oriented to enable a maximum number of the aircraft passengers to view the advertising displays, comprising:
   a. mounting a number of advertising displays having a size visible to passengers on an aircraft on airside non-public airport terminal structures in and adjacent to the airport ramp area in locations on exterior vertical wall surfaces of the airside non-public airport terminal structures where the number of advertising displays of the size visible to the aircraft passengers can be mounted;
   b. providing aircraft equipped with nose landing gear wheel-mounted drive motors controllable to drive the aircraft without operating aircraft engines during ground travel and to orient the direction of ground travel within the airport ramp area along a ground travel path that exposes the maximum number of the passengers on the aircraft to a view of the number of advertising displays and enables the maximum number of passengers to view the advertising displays; and
   c. controlling the drive motors and driving the aircraft in only a forward direction along a ground travel path into and out of the airport ramp area and maneuvering the aircraft in only the forward direction into and out of parking locations within the airport ramp area along the ground travel path so that a longest axis of the aircraft is oriented parallel to the number of advertising displays mounted on the airside non-public airport terminal structures in and adjacent to the airport ramp area while the aircraft is driven in only the forward direction, and providing maximum passenger visibility and exposure to the number of advertising displays while the aircraft is driven in only the forward direction along the ground travel path.

2. The method of claim 1, further comprising mounting the number of advertising displays on airside exterior surfaces of passenger loading bridges selected to be readily visible to passengers on the aircraft with a view of the passenger loading bridge airside exterior surfaces as the aircraft is in only the forward direction in the parallel orientation within the airport ramp area.

3. The method of claim 1, further comprising mounting the number of advertising displays on one or more airside non-public airport terminal structures visible to passengers in the aircraft driven in only the forward direction and maneuvered in the parallel orientation along the ground travel path within the airport ramp area comprising an airport terminal, a structure attached to an airport terminal, an airport terminal structure where the aircraft parks to unload and load passengers, and an airport structure that the aircraft passes during ground travel as the aircraft is driven in only the forward direction and in the parallel orientation past the airport terminal structures.

4. The method of claim 1, further comprising providing an advertising message or display on the number of advertising displays mounted on airside non-public airport terminal structures visible to the aircraft passengers relating to goods or services available for sale at the airport terminal.

5. The method of claim 1, further comprising increasing the visibility and exposure of aircraft passengers to the number of advertising displays by controlling the drive motors on a plurality of aircraft equipped with the drive motors and driving the plurality of aircraft into, out of, and within the airport ramp area in only the forward direction along the ground travel path in the orientation parallel to the number of advertising displays.

6. A method for increasing exposure of passengers on a moving aircraft to advertising messages and displays mounted on structures located within and in the vicinity of a ramp area at an airport comprising:
   a. placing advertising messages and displays in locations within and in the vicinity of the airport ramp area where the advertising messages and displays may be seen by the passengers on an aircraft moving into and out of and maneuvering within the airport ramp area;
   b. controlling movement of the aircraft along a ground travel path within the airport ramp area that permits a maximum number of the passengers on the moving aircraft to see the locations where the advertising messages and displays are placed, wherein movement of the aircraft is controlled by controlling landing gear wheel-mounted drive motors to drive the aircraft along the ground travel path autonomously without engines and tow vehicles; and
   c. driving the aircraft along the ground travel path in only a forward direction into the airport ramp area, in only a forward direction in a parallel travel and parking orientation with the longest axis of the aircraft parallel to the locations of the advertising messages and displays, and in only a forward direction out of the airport ramp area so that the advertising messages and displays are visible to the maximum number of passengers as the aircraft is driven past and parked near the locations of the advertising messages and displays.

7. The method of claim 6, further comprising placing advertising messages and displays in locations within the airport ramp area comprising at least an airport terminal building and on a passenger loading bridge.

8. A method for increasing exposure of passengers on a moving aircraft to advertising messages and advertising displays mounted on structures located within and in the vicinity of a ramp area at an airport comprising:
   a. placing advertising messages and advertising displays in locations within and in the vicinity of the airport ramp area where the advertising messages and advertising displays may be seen by the passengers on an aircraft moving driven into and out of and maneuvering within the airport ramp area;
   b. driving the aircraft with landing gear wheel-mounted drive motors along a ground travel path parallel to the locations of the advertising messages and advertising displays within the airport ramp area that permits a maximum number of the passengers on the moving aircraft to see the locations of the advertising messages and advertising displays while the aircraft is driven along the ground travel path; and
   c. further comprising controlling the landing gear wheel-mounted drive motors and driving the aircraft in only a forward direction into the airport ramp area, driving the aircraft along the ground travel path in only a forward direction in a parallel orientation with the longest axis of the aircraft parallel to the locations of the advertising messages and advertising displays, parking the aircraft in the parallel orientation, and driving the aircraft in only a forward direction out of the airport ramp area so that the advertising messages and advertising displays are visible to the maximum number of passengers as the aircraft in the parallel orientation is driven past and parked near the locations of the advertising messages and advertising displays.

\* \* \* \* \*